Feb. 19, 1924.
M. C. SCHWEINERT
1,484,342
ADAPTER FOR PUMP COUPLINGS
Original Filed April 5, 1919
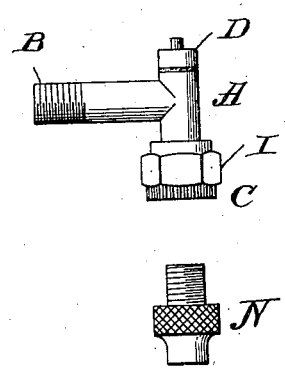
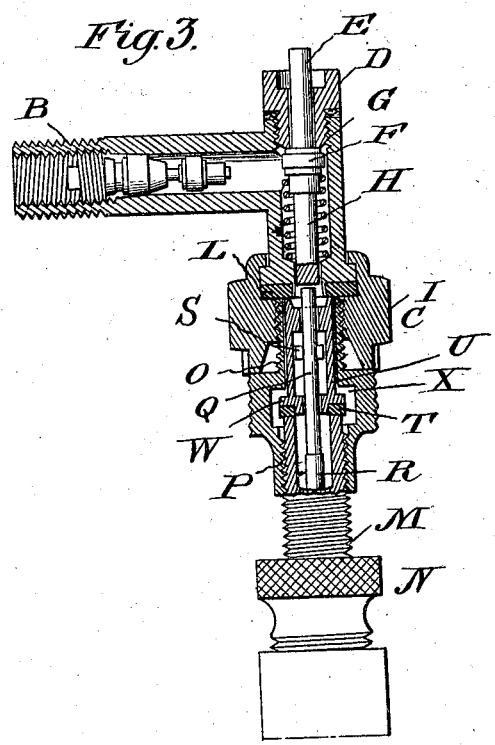
INVENTOR
Maximilian Charles Schweinert
By Attorneys, Patented Feb. 19, 1924.

1,484,342

UNITED STATES PATENT OFFICE.

MAXIMILIAN CHARLES SCHWEINERT, OF NEW YORK, N. Y.

ADAPTER FOR PUMP COUPLINGS.

Application filed April 5, 1919, Serial No. 287,820. Renewed July 14, 1921. Serial No. 484,819.

*To all whom it may concern:*

Be it known that I, MAXIMILIAN CHARLES SCHWEINERT, a citizen of the United States of America, residing in New York, in the county of New York and State of New York, have invented certain new and useful Improvements in Adapters for Pump Couplings, of which the following is a specification.

This invention relates to pump couplings and aims to provide certain improvements therein.

In the type of pump coupling set forth in the patent to M. C. Schweinert, 1,297,741, patented March 18, 1919, there is provided a gauge seat at the top of the coupling which is adapted to receive a pressure gauge for determining the pressure within the tire during the operation of inflating. A pin is provided which extends to the top of the coupling, which pin carries a valve designed to normally close the opening through the top and also has a downward extension which is adapted to depress the pin of the tire valve. The result of this construction is that when the gauge is pressed down on the gauge seat, it automatically opens the valve and simultaneously depresses the valve pin so that air may flow up through the coupling to the gauge.

The present invention, in its preferred form, is directed to a coupling of this type, and it provides an adapter capable of being secured to the bottom of the coupling and which enables the device to be used on a different type of valve, such as the European type. In the preferred form, the adapter comprises a member having an upper screw-thread similar to the thread of the American type of valve. This enables the member to screw in the bottom of the pump coupling which is primarily constructed to fit the American valve. The lower part of the adapter may be differently screw-threaded in order to fit another type of valve, such as the European type. Carried in the adapter is a pin which is longitudinally movable, the upper end of the pin being designed to be engaged by the coupling pin just described, and the lower part of the pin being adapted to enter a valve of different type and depress the deflating pin of such valve. The result of this construction is that when the adapter is in place, the coupling may be used for inflating through a European valve, and the pressure may be ascertained in the same manner as with the American valve, namely, by pressing the gauge down on the gauge seat at the top.

The invention comprises other features of improvement which will be hereinafter set forth.

Referring to the drawings which illustrate one form of the invention,—

Figure 1 is a side elevation of a pump coupling of the type described.

Fig. 2 is an elevation of the adapter in its preferred form.

Fig. 3 is a diametrical section of the pump coupling and adapter combined and shown as in engagement with a European type of valve.

Referring to the drawings, let A indicate the pump coupling as a whole, the branch B of which is adapted for connection to a pump, and the foot C of which is adapted for connection to the standard American tire valve. At the top is arranged a gauge seat D upon which an ordinary pressure gauge can be pressed to make a tight joint with the coupling. Within the vertical portion of the coupling is arranged a pin E carrying a valve F, which engages a seat G, the pin also being provided with an extension H, the lower end of which is adapted to engage the deflating pin of the tire valve structure. When the gauge is pressed down on the seat, it depresses the pin E, thus opening the valve F and depressing the deflating pin of the valve. Air then flows from the valve to the gauge.

In the construction of coupling shown, the latter is provided with a swivelled collar I which is screw-threaded to engage the valve casing, a packing L being provided to contact with the top of the valve casing.

The collar I is threaded to normally engage a standard American valve, and the pin H is of such dimensions and projection as to normally engage the deflating pin of such valve. These proportions are such that the coupling is not operative with the common English type of valve shown at M.

For the purpose of fitting the American coupling to the English valve I provide an adapter N, the preferred form of which is illustrated in the drawings. Such adapter comprises a cylindrical member having at its upper end a screw-threaded extension O, the external thread of which is adapted to fit the threads of the collar I. The cylinder is also interiorly screw-threaded at its lower end, as shown at P, a thread being adapted to fit the exterior thread of the nipple of the European type of valve M. Within the adapter is arranged a supplemental pin Q which is capable of a longitudinal movement in the adapter, which pin Q is provided for the purpose of depressing the deflating pin R of the valve M. Normally it rests lightly upon the top of the deflating pin R. But when a gauge is applied to the seat D, motion is communicated by the pin E to the pin Q and thence to the deflating pin R. This opens the valve M and permits air to pass upwardly to the gauge. Means are preferably provided for maintaining the pin Q in place within the adapter, the means shown comprising an enlarged portion S fitting within a recess in the adapter which permits the necessary longitudinal movement of the pin and which nevertheless prevents escape of the pin.

The invention also comprises a novel construction which permits the packing in the adapter (lettered T) to be forced to a seat on the top of the valve M without destructive distortion of the packing. The means shown for this purpose comprises a cylindrical member U carried within the adapter, the upper part of which is designed to contact with the usual packing L and the lower part of which carries the packing T. The lower part of the cylindrical member U is best formed with a flange W having an annular recess on its lower face in which the packing T is carried. This flange is located within a recess X which permits the flange, and hence the entire member, to move longitudinally in the adapter. It is prevented from escape in one direction by the flange contacting with the top of the recess X, and in the opposite direction by the packing contacting with the bottom of the recess.

The result of this construction is that the cylindrical member is held loosely in the adapter until the coupling is attached to the valve M and the packing T engages the top of the valve. Whereupon the cylindrical member U is tightened between the two packings without necessary rotary movement, the parts I and N swivelling around the cylindrical member until the latter is tightly engaged between the coupling body and the valve. When this construction is adopted the recess within which works the portion S of the pin Q may be conveniently made in the cylindrical member.

While I have shown and described one form of the invention, it will be understood that the invention is not limited thereto, since various changes can be made therein without departing from the spirit of the invention.

What I claim is:—

1. An adapter comprising a member having an externally threaded portion adapted to engage the threads of a pump coupling, and an internally threaded portion adapted to engage the threads on a valve stem different from those adapted to receive the pump coupling, a tubular element within said member and rotatively connected thereto and a packing gasket carried by said tubular element adapted to make a leak-tight joint with the end of a valve stem.

2. An adapter comprising a member having an externally threaded portion adapted to engage the threads of a pump coupling, and an internally threaded portion adapted to engage the threads on a valve stem different from those adapted to receive the pump coupling, a tubular element within said member and rotatively connected thereto, a packing gasket carried by said tubular element adapted to make a leak-tight joint with the end of a valve stem and a reciprocable pin within said tubular element.

In witness whereof, I have hereunto signed my name.

MAXIMILIAN CHARLES SCHWEINERT.